Feb. 10, 1959
CHANG-TSING YANG
2,873,283
EPOXIDATION PROCESS
Filed Dec. 13, 1954
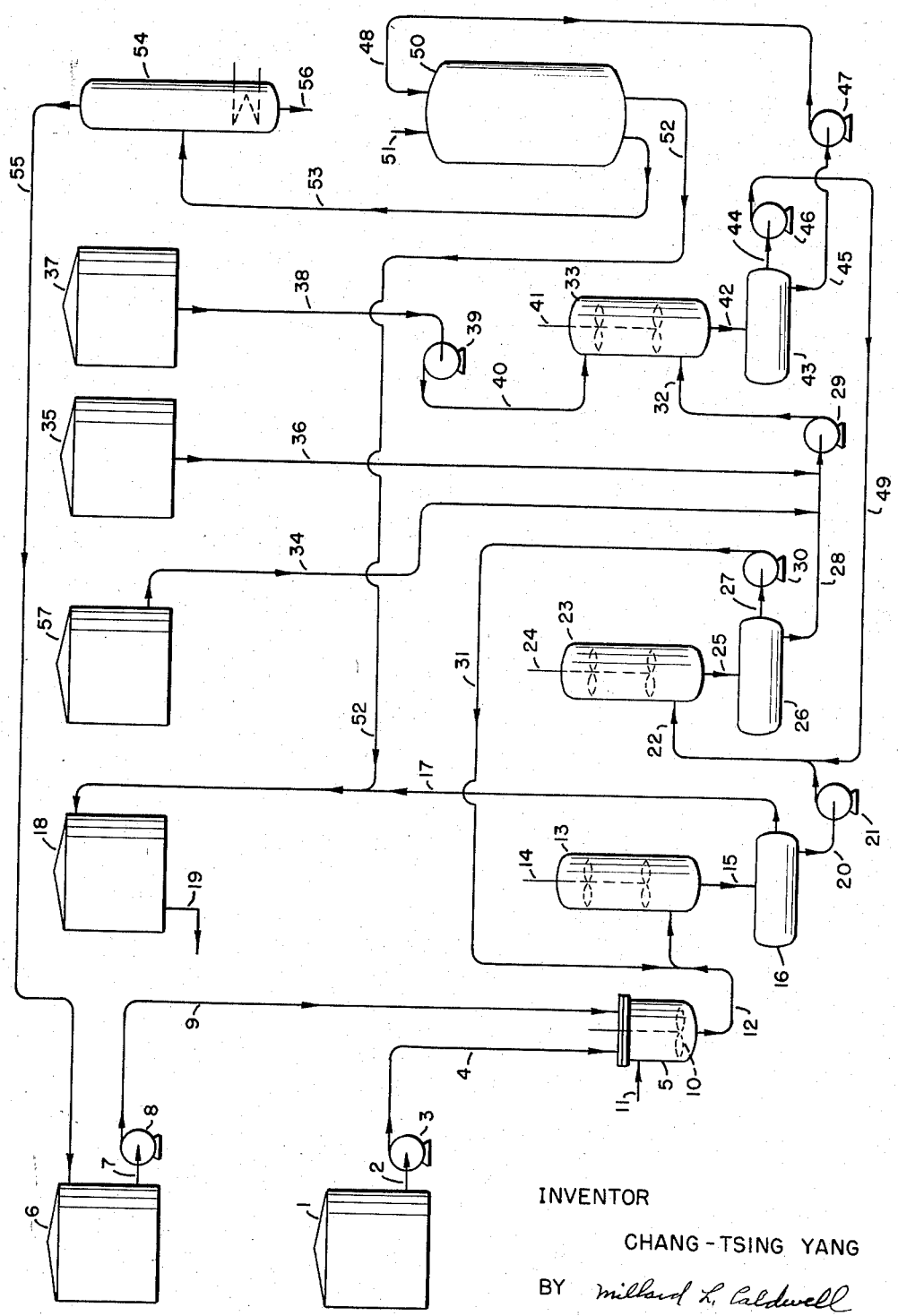
INVENTOR
CHANG-TSING YANG
BY Millard L. Caldwell
HIS ATTORNEY

2,873,283
EPOXIDATION PROCESS

Chang-Tsing Yang, New York, N. Y., assignor to Shell Development Company, New York, N. Y., a corporation of Delaware Application December 13, 1954, Serial No. 474,884

6 Claims. (Cl. 260—348.5)

This invention relates to the production of oxirane compounds. It deals with an improved method of producing these compounds by reacting the corresponding ethylenic compounds with an organic peracid.

Epoxidation with organic peracids is a well known reaction which has been applied to a wide variety of ethylenic compounds, that is, organic compounds containing a double bond between two carbon atoms of aliphatic character, i. e. two carbon atoms in an aliphatic chain or in a non-aromatic ring. Both aliphatic and aromatic peracids can be used as the epoxidizing agent. However, as heretofore carried out, these reactions have been conducted as a single stage operation in which the organic peracid, usually in solution in the organic carboxylic acid from which it was derived, is added over a suitable period of time to the ethylenic compound being epoxidized, the reaction being continued in the resulting homogeneous or heterogeneous system depending upon the solubility relationships of the components until the desired degree of epoxidation is achieved. The organic peracid used can be separately prepared or can be produced in the reaction mixture by reaction of a suitable peroxide, for example, hydrogen peroxide, with the chosen organic acid. This method of epoxidation is subject to serious disadvantages. In particular, it has been found that long reaction times are necessary for high conversions of ethylenic compounds to epoxides, and the consumption of costly reactants, especially organic peracid, is considerably higher in practice than the theoretical requirements for the reaction. This makes the process expensive. Also, in the previous method of conducting the reaction where peracid is preformed, the explosion hazard involved has made exacting control necessary, and numerous precautions which add to the cost of operation on a commercial scale have been required. In spite of these precautions, plant operations have been disrupted by explosions. These factors have tended to deter more widespread use of the method.

It is an object of the present invention to provide a method which avoids the foregoing disadvantages of prior methods of epoxidizing ethylenic compounds by reaction with organic peracids. An important object is the provisions of an epoxidation method in which more efficient use is made of the feed materials and, in particular, consumption of epoxidizing agent is reduced. Another object is to effect a substantial saving in both labor and time with the result of increasing the capacity of a given plant. Still another object is to provide a safer method of epoxidizing ethylenic compounds with peracids. Further objects and advantages of the new method will be apparent from the following description of the invention.

In accordance with the present invention, ethylenic compounds are epoxidized in a system containing two liquid phases, one of these phases containing the organic peracid being used as epoxidizing agent and the other liquid phase containing the ethylenic compound to be epoxidized. The epoxidation with these incompletely miscible liquid phases is carried out in a plurality of reaction stages in series through which the peracid epoxidizing agent and the ethylenic compound pass in countercurrent to each other. A particularly advantageous modification of the new process comprises the production of the peracid epoxidizing agent by adding a peroxide and a carboxylic acid to the last reaction stage of the series in which the final epoxidation of the ethylenic compound is carried out.

It has been found that important savings in operating cost can be achieved by this improved method of operation. Not only is the consumption of organic peracid in the process reduced compared with prior methods of conducting similar epoxidations but also the process can be ducted efficiently with mixtures which eliminate essentially all the operational hazards. Furthermore, by this method of operation relative uniform reaction rates can be maintained throughout the process. This is in contrast to the single-stage epoxidation method in which the concentration of epoxidizing agent is low toward the end of the reaction when the concentration of ethylenic compound is also low with the result that the reaction rate is low and the overall reaction time must be considerably prolonged in order to achieve efficient conversion of the ethylenic compound.

The amount of peroxide wasted by decomposition has been found to be dependent upon time and the presence of certain metallic ions. The long reaction times involved in the single-stage epoxidation method have favored this type of peroxide loss. In the new method the driving force for the desired epoxidation is high throughout the operation. It is promoted in the first reaction stage where the concentration of epoxidizing agent is lowest by the high concentration of ethylenic compound present, and in the final stage of reaction by the high strength of peracid in the mixture. As a result, the total reaction time in the process is reduced and the production capacity of a plant of given size is increased. The consumption of epoxidizing agent in the new process is reduced not only due to the shortened reaction times which are made feasible, but also because any water-soluble impurities in the feed which tend to react with or decompose peroxy compounds are removed from the organic phase during the phase separation at the end of the first reaction stage before they come into contact with the more concentrated peroxide in the later stages of the process. This last factor is particularly beneficial when epoxidizing ethylenic compounds on a commercial scale since it is almost always necessary in such cases to use impure organic starting materials containing metallic ions and/or other impurities reactive with the peroxy compounds used for epoxidation. By the process of the new invention, the time of contact of the peroxide with these peroxide-decomposing impurities is substantially decreased and the loss of peroxide by such decomposition is materially reduced. In addition, by making it feasible to obtain complete epoxidation of the ethylenic compound in a reasonable time, the new method facilities production of epoxides of higher quality without resort to expensive finishing treatments for removal of unreacted started materials which are often difficult to separate efficiently and economically.

The preferred modification of the new method, in which the organic peracid is formed by adding peroxide and carboxylic acid in the last of the epoxidation reaction stages, makes use of the organic acid produced in the epoxidation reaction also as a peroxygen carrier. It has the further advantages of reducing the amount of organic acid which must be employed in the process and saving the labor and other expenses involved in separate preparation of the organic peracid. Also, it becomes feasible by this method of operation to eliminate the explosion hazard which is involved in the reaction of organic compounds with concentrated peroxides under other methods of operation.

As previously indicated, the new method is carried out in a system containing two liquid phases, one of which contains the ethylenic compound while the other contains the peracid epoxidizing agent. In the preferred modification of the process wherein the peracid is formed by adding the corresponding carboxylic acid and a peroxide in the final epoxidation stage, water will be a product of the reaction and, hence, will always be present in the reaction mixture whether added initially with one or more of the reactants or not. The water will usually be distributed between the phases and the phase containing the greater proportion of the water is referred to as the aqueous phase of the system. The system can therefore be described as one which contains an aqueous phase containing one of the reactants and a non-aqueous phase containing the other reactant. It is often advantageous, especially when using the preferred lower fatty peracids, to employ the peracid epoxidizing agent in the aqueous phase of the reaction mixture. If the ethylenic compound is a suitable water-insoluble liquid, it can constitute the other phase of the reaction mixture. Usually it is desirable, however, when employing the peracid in the aqueous phase, to use the ethylenic compound as a solution in a water-insoluble solvent, preferably a liquid having a solubility of not more than about 2% by weight in water. Hydrocarbon solvents are generally satisfactory. These can be, for instance, normally liquid aliphatic or cycloaliphatic hydrocarbons, for example, saturated hydrocarbons such as normal- or iso-pentane, the hexanes, octanes, cyclohexane, etc., or aromatic hydrocarbons of which benzene, toluene, the xylenes, and the like are typical. One can also use normally gaseous hydrocarbons such as ethane, propane and the butanes by carrying out the process under sufficient pressure to maintain a liquid hydrocarbon phase at the chosen reaction conditions. Hydrocarbon mixtures, for instance, suitable fractions of gasoline or kerosene or higher or lower boiling fractions of petroleum or other hydrocarbons can be similarly used. Instead of hydrocarbons, halogenated hydrocarbons, for instance, chloroform, carbon tetrachloride, or chlorine or fluorine substitution products of the foregoing hydrocarbons can be used, as can ethers, the higher alcohols, ketones, etc. Solvents which are substantially unreactive under the conditions of operation are preferred.

The expoxidation can be carried out with any of the organic peracid epoxidizing agents. A great number of these peracids are known. The peracids derivable from the fatty acids, especially the lower fatty acids of one to four carbon atoms, i. e. formic, acetic, chloracetic, propionic, normal- and iso-butyric acids, are suitable. One can also use the peracids of higher fatty acids, for instance, caproic acid, or aromatic acids such as benzoic acid, the toluic acids, etc. Peracids from polycarboxylic acids as well as from monocarboxylic acids can be used. Thus, monoperphthalic or diperphthalic acids, or monoperoxalic or diperoxalic acids, or mono- or di-persuccinic acids are useful epoxidizing agents in the new process.

The process is especially advantageous for the epoxidation of poly-cyclic ethylenic compounds which form stable epoxides. Examples of compounds of this type which are particularly useful starting materials because of the value of the products as insecticidal materials are the mono- and di-olefinic fused ring compounds having the 5 to 6 carbon atoms in each ring, for instance, 1,4-methano - 2,5 - cyclohexadiene, hexa- and octa - hydronaphthalenes, 2,3 - dichloro - 1,4 - methano - 2,5 - cyclohexadiene, 2,3 - dichloro - 1,4,4a,5,8,8a - hexa - hydro-1,4,5,8 - exo - endo - dimethanonaphthalene, 5,6-dichloro-4,7 - methano - 3a,4,7,7a - tetrahydroindene, and the like. Epoxidations of halopolycyclic ethylenic compounds containing up to five linearly fused bicycloheptane rings and thus having 12 to 27 carbon atoms in the rings such as are described in U. S. Patent 2,676,131, can be carried out with especial advantage by the present method.

The reaction conditions of temperature, pressure, time of reaction and the proportions and concentrations of the reactants which it will be most desirable to use in a given case will depend upon the particular ethylenic compound being epoxidized and the organic peracid chosen as epoxidizing agent. In general, temperatures below 100° C. are preferred and usually temperatures of the order of about 0° to 75° C. will be suitable. The time of contact which will be necessary to effect the desired reaction will decrease with increasing reaction temperature but will generally fall in the range of about 30 minutes to about 48 hours. In all cases the pressure must be sufficient to maintain the two liquid phases present which are necessary for successful operation of the new method. Ordinary atmospheric pressure is usually most advantageous but higher or lower pressures can be used.

The ethylenic compound and epoxidizing agent can be used in stoichiometric proportions or an excess of either of these reactants can be employed. Where it is desirable to obtain as complete conversion of ethylenic compound to epoxy products as possible, an overall excess of organic peracid will usually be advantageous. Conversely, when complete consumption of peroxide is more important, one will ordinarily employ an excess of the ethylenic compound. Thus, in general, between about 0.75 to 2.0 moles of peroxide will be used per mole of ethylenic unsaturation in the starting ethylenic compound. It is an important advantage of the new process that the overall consumption of peroxide is generally lower for given conversions than in prior methods.

It is a special feature of the new method in its preferred modification, wherein the organic percarboxylic acid epoxidizing agent is formed by adding a peroxide and carboxylic acid to the last epoxidation stage of the reaction, that the concentrations of peroxide in the system can be kept outside the explosive limit without sacrifice of yield or plant output. This is due to the fact that the highest concentration of peroxide in the system will be in the aqueous phase in the last reaction stage. In this stage the peroxide content of the aqueous phase will increase during the time peroxide is being added but a portion, either as such or in the form of peracid, is continually being consumed and converted into water, and the peracid formed is continually diffusing into the other phase of the mixture and completing the epoxidation of the partially reacted ethylenic compound therein. Therefore, the peroxide content in the aqueous phase of the last stage will always be lower than that in a preformed peracid mixture made from the same quantities of peroxide and carboxylic acid. The earlier stages of the epoxidation are carried out with partially spent aqueous peracid-containing phase from the later stages, so the peroxide content of these stages will always be lower than that of the final reaction stage. One has, therefore, only to control the concentrations of peroxide and carboxylic acid in the final stage in order to avoid all explosion hazard in the system. This is readily accomplished, for example, by maintaining the peroxide concentration in the aqueous phase of the final reaction stage below about 35% and the carboxylic acid content below 60%. Other proportions can, of course, be used but it is preferred to operate so as not to exceed these limits and, more preferably, to use proportions such that the concentrations of peroxide in the aqueous phase in the last reaction stage wherein the peracid is being formed is about 15% to about 35% and the organic acid content about 25% to about 50%, the remainder being chiefly water. Proportions within these ranges can advantageously be achieved by using for the reaction aqueous peroxide, for instance, hydrogen peroxide, of about 25% to 80% concentration and a water-soluble carboxylic acid such as formic or acetic acid in an overall ratio of about 0.5 to about 2.0 moles per mole of the ethylenic compound being epoxidized.

The reaction can be carried out non-catalytically, or any of the various catalysts for epoxidation can be employed. Especially when producing stable epoxides it is advantageous to use a small amount of acid catalyst, for example, sulfuric or phosphoric acid, or the like. When epoxidizing polymerizable compounds it may be advantageous to add a small amount of polymerization inhibitor.

The number of reaction stages which can be used may be varied. As a rule, the greater the number of stages the better will be the performance. However, the increased investment in equipment, the time required for phase separation and the additional labor involved as the number of stages is increased have to weighed against the improvement in operation which is obtained. As a general rule, two to four stages are sufficient for most practical purposes. The epoxidation load can be distributed equally between the different stages, or it can vary among the stages. Thus, good results can be obtained in the two-stage process when the epoxidation load is distributed 20% in the first stage and 80% in the final stage, or 80% in the first stage and 20% in the final stage, or in intermediate ratios. More preferably, the loads are distributed more nearly equally, say about 35:65 to 65:35, in the first and final stages when two reaction stages are used. A typical distribution for the successive stages of a four-stage system is, for instance, 10%, 25%, 25% and 40%, respectively, but these proportions can be reversed or otherwise varied as widely as in the case of the two-stage system described above.

The attached drawing illustrates diagrammatically one suitable flow arrangement for carrying out the process in three reaction stages, using one exemplary assemblage of apparatus which is not drawn to scale. In the drawing, 1 represents a storage tank or other source of the ethylenic compound which is to be epoxidized. This compound is indicated as being in a pumpable form, that is, as a liquid or solution which can be withdrawn by line 2 and pump 3 and conveyed by line 4 to a mixing tank 5. A suitable solvent for the ethylenic compound, in the present example a water-insoluble solvent such as a liquid hydrocarbon, from tank 6 is transferred by line 7, pump 8 and line 9 to tank 5 where it is thoroughly mixed by means of a stirrer 10 with the ethylenic compound, and a portion of the organic acid is introduced by line 11, the amount of acid introduced depending upon the relative amounts of organic and aqueous phases and the distribution coefficient of the organic acid between the phases. The resulting liquid mixture, in controlled concentrations and amount, is withdrawn by line 12 and fed to the first stage reactor 13 together with the aqueous phase separated in the next reaction stage, as hereinafter described. This aqueous phase, which is introduced by line 31, contains the organic peracid epoxidizing agent remaining unreacted after the second reaction stage, carboxylic acid corresponding to the peracid and a catalyst for the reaction, where such is being used, for instance, sulfuric acid. In reactor 13, the two immiscible phases are thoroughly mixed by stirring means 14 while the temperature is controlled by means not shown, usually cooling means to keep the mixture within the range of about 20° to about 75° C. The reaction is continued until sufficiently complete, preferably substantially complete, conversion of the peracid is obtained. The reacted mixture is then taken off by line 15 to a settling drum 16 in which the liquid phases are allowed to separate. The aqueous phase of the mixture is removed by line 17 to a storage tank 18 from which the liquid is delivered to the carboxylic acid recovery system, not shown, via line 19.

The water-insoluble phase from separator 16, containing the epoxy product formed in the first reaction stage, unreacted ethylenic compound, solvent from tank 6 and carboxylic acid distributed in the phase, is pumped by pump 21 through lines 20 and 22 to the second stage reactor 23 which is equipped with stirrer 24 and temperature controlling means not shown. Also introduced by line 22 is partially reacted aqueous phase from the final reaction stage, which phase is introduced by line 49. In reactor 23, the two phases are thoroughly mixed and maintained in the previously indicated temperature range until the predetermined amount of reaction has taken place. The amount of reaction which is conducted in this stage can be varied widely. It should be carried out sufficiently so that an undue burden is not placed upon the final reaction stage but not so far as to reduce the peracid content of the aqueous phase below that required for carrying out the desired degree of epoxidation in the first reaction stage. After completion of this amount of reaction, the mixture is withdrawn by line 25 to settler 26 from which aqueous phase is removed by line 27 and pumped by pump 30 through line 31 to reactor 13, as previously described. The hydrocarbon phase of the mixture containing the same components as the mixture removed by pump 31 from settler 16, but containing a higher proportion of epoxidized product and correspondingly lower amount of unreacted ethylenic compound, is taken off by line 28.

The partially reacted hydrocarbon phase from separator 26 is fed to the final stage reactor 33 through pump 29 and lines 28 and 32, together with organic acid from tank 57 introduced by pump 29 and lines 34, 28 and 32, catalyst fed by line 36 from a source such as tank 35, and peroxide, preferably aqueous hydrogen peroxide supplied from tank 37 by lines 38, 40 and pump 39. In reactor 33 the epoxidation reaction is carried out, advantageously, to complete or substantially complete conversion of the ethylenic compound to epoxide, while peroxy acid is simultaneously formed by reaction of the carboxylic acid fed by line 34 with the peroxide introduced by line 40. On completion of the reaction the mixture, which has been under temperature control by means not shown, is withdrawn by line 42 to separator 43 in which the aqueous phase is decanted from the hydrocarbon phase, removed by line 44 and pumped by pump 46 and line 49 to the second reaction stage. This aqueous phase is made up of organic peroxyacid, the corresponding carboxylic acid, catalyst and water. The hydrocarbon phase of the mixture which is taken off by line 45 contains the reaction product together with a small amount of the said carboxylic acid and the hydrocarbon solvent. It is pumped by pump 47 via line 48 to extractor 50 where the acids and water-soluble material are extracted by water introduced from line 51. The aqueous extract is sent to tank 18 via line 52, while the raffinate is sent to still 54 via line 53 to recover the solvent which is taken off by line 55 and conducted to storage tank 6. The epoxidized product is recovered by line 56.

The process can be carried out batchwise, for instance, using a single reactor and separator successively for the different stages of reaction, or can be operated continuously or intermittently. Instead of settlers, centrifuges can be used for carrying out the phase separations which follow the reaction stages. Still other variations can be made in the process.

The following examples illustrate some of the applications of the new method in epoxidizing ethylenic compounds of different types.

*Example I*

The insecticide "Dieldrin" (1,2,3,4,10,10-hexachloro-6,7 - epoxy - 1,4,4a,5,6,7,8,8a-octahydro-1,4,5,8-endo-exo-dimethanonaphthalene) was produced by epoxidizing "Aldrin" (1,2,3,4,10,10-hexachloro-1,4,4a,5,8,8a-hexahydro-1,4,5,8-endo-exo-dimethanonaphthalene) in three reaction stages in series conducted as shown in the drawing so as to carry out approximately 20% of the reaction in the first stage, 35% in the second stage, and 45% in the final stage. A solution of technical grade "Aldrin" of 93.6% purity in benzene, containing 46.2% by weight of "Aldrin," was used as feed. The epoxidation was carried out with peracetic acid formed in situ in the presence of sulfuric acid, the feed to the final reaction stage being acetic acid and 59.7% aqueous hydrogen peroxide with 2.5% of sulfuric acid, based on the total weight of acetic acid and hydrogen peroxide solution used. The reaction temperature in each of the reaction stages was maintained at 64–65° C. In each of the reaction stages the ratio of acetic acid was 0.5 mole per mole of "Aldrin" fed initially to the first stage. The conditions maintained in the different stages and the results obtained were as follows:

| Stage | Wt. Percent of "Aldrin" in Organic Phase at Start | Moles of Peroxide Charged per Mole of "Aldrin" [1] | Reaction Time (hours) | Mole Percent Peroxide in Charge Consumed |
|---|---|---|---|---|
| 1 | 46.2 | 0.22 | 5 | 82.0 |
| 2 | 32.0 | 0.60 | 4 | 71.6 |
| 3 | 14.3 | 1.13 | 4 | 35.4 |

[1] Based on total amount of "Aldrin" in the charge to stage 1. At the end of the the 4th hour in stage 3, 98.5 mole percent of "Aldrin" was converted.

*Example II*

Crude "Aldrin" (82.4% purity), as a 50% solution in benzene, was epoxidized in two countercurrent reaction stages using as feed to the second stage 1.5 moles of 35% by weight aqueous hydrogen peroxide and 2 moles of acetic acid per mole of "Aldrin" fed to the first reaction stage. A 40% solution of sulfuric acid was used as catalyst in the amount required for 2.5% by weight based on the acetic acid and hydrogen peroxide solution used. With a temperature of 65° C. in both stages and reaction times of 3 hours in the first stage and 3½ hours in the second stage, 96.6% conversion of "Aldrin" to "Dieldrin" was obtained with 0.18 mole of peroxide unreacted at the end per mole of "Aldrin" charged. By this method of operation savings of up to 20% of peroxide compared to single stage operation can be realized.

Equally good results are obtained in epoxidizing 1,2,3,4,10,10 - hexachloro - 1,4,4a,5,8,8a-hexahydro-1,4,5,6-endo-endo-dimethanonaphthalene to 1,2,3,4,10,10-hexachloro-6,7 - epoxy-1,4,4a,5,6,7,8,8a-octahydro-1,4,5,6-endo-endo-dimethanonaphthalene.

*Example III*

While operation with two phase systems made up of an aqueous phase and a non-aqueous liquid phase has been emphasized because of the special advantages of these systems in the new process, the invention can be carried out in other ways. For instance, when using the generally less preferred modification in which the peracid is formed as a separate step, it is feasible to operate under substantially anhydrous conditions using two incompletely miscible liquid organic phases as the reaction mixture. Thus, for example, unsaturated higher fatty acid esters, typically soybean oil and the like, can be successfully epoxidized with an anhydrous or substantially anhydrous solution of peracetic acid or performic acid in methanol in a plurality of stages through which the methanol solution and the liquid fatty ester or esters pass in counter current to each other in accordance with the invention. The process can be similarly operated when using ethylenic compounds which are too soluble in the peracid solution employed to form the desired two phases by using a solution of the ethylenic compound in a solvent which provides the required limited solubility.

It will thus be seen that the new process is capable of considerable variation not only with respect to the ethylenic compounds which can be epoxidized and the peracids which can be used as epoxidizing agents but also in regard to the method of operation which is employed in carrying it out. It will therefore be understood that the invention is not limited to the procedures which have been described by way of illustration, nor by any theory proposed in explanation of the improved results which are obtained.

I claim as my invention:

1. A process for epoxidizing a 1,2,3,4,10,10-hexachloro-1,4,4a,5,8,8a-hexahydro - 1,4,5,8 - dimethanonaphthalene which comprises reacting a benzene solution of said dimethanonaphthalene in a first reaction stage with an aqueous peracetic acid solution at about 20° to about 75° C. in the presence of a catalytic amount of sulfuric acid until at least 10% but not more than 80% of the dimethanonaphthalene is converted, separating the phases of the reaction mixture, contacting the separated dimethanonaphthalene-containing hydrocarbon phase with an aqueous peracetic acid solution of higher peracetic acid concentration containing sulfuric acid catalyst at a temperature of about 20° to about 75° C. for a time at which partial conversion of the reactants takes place, again separating the phases of the reaction mixture, feeding the separated aqueous peracetic acid-containing phase to said first reaction stage and completing the epoxidation of the dimethanonaphthalene by contacting the separated hydrocarbon phase in a final reaction stage to which is fed aqueous hydrogen peroxide, acetic acid and sulfuric acid catalyst in proportions of about 0.75 to 2 moles of peroxide and about 0.5 to about 2 moles of acetic acid per mole of said hexachlorodimethanonaphthalene fed to the system, and recovering the epoxidized hexachlorodimethanonaphthalene thus produced.

2. In a process for epoxidizing a member of the group consisting of mono- and di-olefinic polycyclic hydrocarbons and chloro-hydrocarbons having fused rings of 5 to 6 carbon atoms by reacting a two phase mixture comprising an aqueous phase containing a lower fatty peracid of 1 to 4 carbon atoms and a separate phase containing said olefinic compound, the improvement which comprises carrying out said reaction in a plurality of reaction stages, intimately dispersing the feed of said olefinic polycyclic compound in a first reaction stage with an aqueous phase containing said peracid from a later reaction stage of the series to effect partial epoxidation of said olefinic polycyclic compound, separating the phases of the reaction mixture, further reacting the olefinic compound-containing phase with an aqueous solution of said fatty peracid in a later reaction stage in which incomplete conversion of said peracid is effected, separating the phases of the resulting reacted mixture, feeding thus separated aqueous fatty peracid-containing phase to said first reaction stage and recovering epoxidation product from the last of the reaction stages.

3. In a process for epoxidizing a member of the group consisting of mono- and di-olefinic polycyclic hydrocarbons and chloro-hydrocarbons having fused rings of 5 to 6 carbon atoms by reacting a two-phase mixture of a solution of said olefinic polycyclic compound in a water-insoluble inert liquid solvent with an aqueous solution of a lower fatty peracid of 1 to 4 carbon atoms, the improvement which comprises carrying out said reaction in a plurality of reaction stages, intimately dispersing a solution of said olefinic polycyclic compound in said solvent with an aqueous phase containing said peracid from a later reaction stage of the series to effect partial epoxidation of said olefinic polycyclic compound, separating the phases of the reacted mixture, further reacting the phase containing said olefinic compound and its epoxidation product in solution in said solvent in a later reaction stage to which is fed a lower fatty acid of 1 to 4 carbon atoms, hydrogen peroxide and an acid of the group consisting of sulfuric and phosphoric acids whereby said fatty peracid is formed and partly reacted to further epoxidize said olefinic polycyclic compound, again separating the phases of the reacted mixture and using the separated aqueous phase containing said fatty peracid for partial epoxidation of said olefinic polycyclic compound in an earlier stage of the series.

4. A process in accordance with claim 3 wherein a hydrocarbon solution of said polycyclic olefinic compound is reacted with aqueous peracetic acid formed by adding hydrogen peroxide, acetic acid and a catalytic amount of sulfuric acid in the last reaction stage of the series.

5. A process in accordance with claim 4 wherein a peroxide concentration of about 15% to about 35% and an acetic acid content of about 25 to about 50% is maintained in the aqueous phase of the final stage of the reaction.

6. A process in accordance with claim 4 wherein 1,2,3,4,10,10 - hexachloro-1,4,4a,5,8,8a - hexahydro - 1,4,5,8-endo-exo-dimethanonaphthalene is epoxidized.

References Cited in the file of this patent

UNITED STATES PATENTS

| | | |
|---|---|---|
| 2,443,280 | Swern | June 15, 1948 |
| 2,458,484 | Terry | Jan. 4, 1949 |
| 2,485,160 | Niederhauser | Oct. 18, 1949 |
| 2,543,419 | Niederhauser | Feb. 27, 1951 |
| 2,676,131 | Soloway | Apr. 20, 1954 |
| 2,676,132 | Bluestone | Apr. 20, 1954 |
| 2,801,253 | Greenspan et al. | July 30, 1957 |

OTHER REFERENCES

Swern: J. A. C. S., 67:1786–89.

Groggins: "Unit Processes in Org. Syn.," 4th ed. (1952), pp. 418, 419.

DuPont: Electrochemicals Dept., Bulletin #P61–454.

Becco: Chemical Division Food Machinery and Chemical Corp. Bulletin #69.